(12) United States Patent
Earl et al.

(10) Patent No.: US 11,394,745 B2
(45) Date of Patent: Jul. 19, 2022

(54) METHODS AND APPARATUS FOR FINDING GLOBAL ROUTING HIJACKS

(71) Applicant: Dynamic Network Services, Inc., Redwood Shores, CA (US)

(72) Inventors: Zmijewski Edward Earl, West Lebanon, NH (US); Madory Douglas, Lebanon, NH (US); Sergeyev Alexandr, Bedford, NH (US)

(73) Assignee: Dynamic Network Services, Inc., Redwood Shores, CA (US)

( * ) Notice: Subject to any disclaimer, the term of this patent is extended or adjusted under 35 U.S.C. 154(b) by 268 days.

(21) Appl. No.: 16/078,302

(22) PCT Filed: Feb. 22, 2017

(86) PCT No.: PCT/US2017/018907
§ 371 (c)(1),
(2) Date: Aug. 21, 2018

(87) PCT Pub. No.: WO2017/147166
PCT Pub. Date: Aug. 31, 2017

(65) Prior Publication Data
US 2021/0194918 A1     Jun. 24, 2021

Related U.S. Application Data

(60) Provisional application No. 62/298,169, filed on Feb. 22, 2016.

(51) Int. Cl.
*H04L 9/40* (2022.01)
*H04L 45/02* (2022.01)

(52) U.S. Cl.
CPC .......... *H04L 63/1466* (2013.01); *H04L 45/04* (2013.01); *H04L 63/1416* (2013.01); *H04L 45/02* (2013.01)

(58) Field of Classification Search
CPC . H04L 63/1466; H04L 45/04; H04L 63/1416; H04L 45/00; H04L 67/104;
(Continued)

(56) References Cited

U.S. PATENT DOCUMENTS 10,511,573 B2 * 12/2019 Larson ................ H04L 61/6004
2005/0198382 A1 * 9/2005 Salmi ...................... H04L 45/54
709/240

(Continued)

FOREIGN PATENT DOCUMENTS

CN     101588343 A     11/2009
CN     102158469 A     8/2011
(Continued)

OTHER PUBLICATIONS

Deng et al., "ROSSEAU: A Monitoring System for Interdomain Routing Security", Communication Networks and Services Research Conference, CNSR 2008, 2008, pp. 255-262.
(Continued)

*Primary Examiner* — Aftab N. Khan
(74) *Attorney, Agent, or Firm* — Invoke

(57) ABSTRACT

Every day, thousands of routing "hijacks" occur on the Internet, almost all of them benign. The malicious ones and the resulting misdirection of Internet traffic can be identified by applying sophisticated analytics to extensive global real-time feeds of Border Gateway Protocol (BGP) routing updates. When legitimate attacks are discovered, the automated analysis may be augmented with Domain Name Service (DNS) data (to determine the likely targets), traceroute data (to determine if they represent Man-In-The-Middle exploits), inferred business relationships (to understand the scope of the impacts) and even the raw BGP messages. These techniques can be used to uncover attacks against both commercial and government entities.

18 Claims, 6 Drawing Sheets

(58) Field of Classification Search
CPC . H04L 12/5689; H04L 43/0876; H04L 63/14; H04L 45/306; H04L 45/60; H04L 45/70; H04L 45/58; H04L 29/06; H04L 12/801
See application file for complete search history.

(56) References Cited

U.S. PATENT DOCUMENTS

| | | | |
|---|---|---|---|
| 2010/0263041 | A1 | 10/2010 | Shea |
| 2012/0331555 | A1* | 12/2012 | Retana .............. G06Q 30/0241 726/23 |
| 2015/0333983 | A1* | 11/2015 | Ogielski ................ H04L 45/12 370/250 |
| 2019/0349396 | A1* | 11/2019 | Compton ............... H04L 45/72 |
| 2021/0194918 | A1* | 6/2021 | Earl ................... H04L 63/1466 |

FOREIGN PATENT DOCUMENTS

| | | |
|---|---|---|
| CN | 102394794 A | 3/2012 |
| CN | 105049419 A | 11/2015 |
| JP | 2007-053430 A | 3/2007 |
| JP | 2010-200245 A | 9/2010 |

OTHER PUBLICATIONS

Schutrup et al., "BGP Hijack Alert System", Universiteit Van Amsterdam, System and Network Engineering, Research Project 1, Feb. 7, 2016, 41 pages.

Johann Schlamp, "Investigating the Nature of Routing Anomalies: Closing in on Subprefix Hijacking Attacks," International Workshop on Traffic Monitoring and Analysis, vol. 9053, Apr. 2015, pp. 173-187.

Quentin Jacquemart, "Towards uncovering BGP hijacking attacks," Networking and Internet Architecture, [cs.NI]. Télécom ParisTech, 2015, pp. 1-190.

* cited by examiner

METHODS AND APPARATUS FOR FINDING GLOBAL ROUTING HIJACKS

CROSS-REFERENCE TO RELATED APPLICATION(S)

This application is a national stage of International Application No. PCT/US2017/018907, filed Feb. 22, 2017, which claims the benefit of U.S. Provisional Application No. 62/298,169, filed Feb. 22, 2016, the entire contents for both of which are hereby incorporated by reference as if fully set forth herein.

BACKGROUND

In February 2013, a Belarusian attacker redirected select Internet traffic through its own network. This means that it was possible for the attacker to copy the diverted traffic, inspect its contents, and identify targets for future exploits. The primary targets included major financial institutions, various governments, and global networking firms. While this behavior was observed on an almost daily basis in February 2013, it abruptly stopped at the beginning of March, only to resume again for a couple of days in May. In a limited historical review, similar Belarusian attacks occurred sporadically throughout 2012 against different targets.

FIG. 1 shows a traceroute for a similar attack that occurred in August 2013 from Iceland. This traceroute indicates that for a period of time traffic between two Internet Service Providers (ISPs) in Denver was diverted to Iceland, where it was susceptible to local interception. Under normal circumstances, this traffic would travel from the origin in Denver to the destination (also in Denver) via Dallas and Kansas City, Mo. Under no circumstances should Iceland ever be traversed for Internet traffic between two other countries. In other words, Iceland is generally a terminal point for Internet traffic.

Internet route hijacking attacks like those perpetrated in 2012 and 2013 allow the attackers to copy the diverted traffic, inspect its contents, and identify targets for future exploits. In many of these attacks, communications are not actually disrupted, so it is difficult for victims to notice that anything is amiss. Attacks that don't disrupt communications may be the work of a state actor or criminal organization subverting the Internet for surveillance and/or targeting. Alternatively, the attacks may suggest the development of a cyberweapon capability. Regardless of the number of responsible parties, their identities, and their motivations, such events represent deliberate attacks by sophisticated actors controlling major country-level Internet Service Provider (ISPs). These incidents could not be accidental and point to a considerable long-standing vulnerability in the Internet's foundational structure, one that has continued to be exploited in a targeted and undoubtedly malicious way over the past couple of years.

SUMMARY

Embodiments of the present technology includes methods of detecting routing hijacks on the Internet. Examples of these methods include collecting a plurality of Border Gateway Protocol (BGP) updates from a plurality of BGP routers among a plurality of Autonomous Systems (ASs) on the Internet. Each of these BGP updates includes at least one prefix. At least one new origin is identified based on the BGP updates. A plurality of prefixes with the new origin is formed from among the prefixes included in the BGP updates. One or more RFC1918 prefixes are removed from these prefixes, and at least one of the remaining prefixes is reported as a potential routing hijack.

Another exemplary method of detecting routing hijacks on the Internet, BGP updates are collected from BGP routers among ASs on the Internet, with each BGP update including at least one prefix. A plurality of prefixes with at least one new origin is identified from among the prefixes included in the plurality of BGP updates. At least one new AS number (ASN) is identified based on the BGP updates. Next, it is determined if a registration of the new ASN is equivalent to an associated prefix in the plurality of prefixes. This associated prefix is removed from the list of associated with the new AS path, at least one of the remaining prefixes is reported as a potential routing hijack.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Finding a route hijacking attack in an environment as diverse and dynamic as the global Internet is a complex undertaking. Every day, thousands of routing "hijacks" can be observed, almost all of them benign. This application describes techniques for identifying the malicious hijacks and the resulting misdirection of Internet traffic. These techniques involve collecting extensive global real-time feeds of Border Gateway Protocol (BGP) routing updates and applying sophisticated analytics, based in part on historical BGP routing data, to the collected BGP routing updates. When legitimate attacks are discovered, the analytics can be augmented with Domain Name System (DNS) data (to determine the likely targets), traceroute data (to determine if the attacks represent Man-In-The-Middle exploits), inferred business relationships (to understand the scope of the impacts), and the contents of the BGP routing updates themselves. The techniques for identifying and analyzing malicious hijacks can be applied to any targets globally and can be used to detect both deliberate attacks (e.g., attacks that are clearly malicious in nature) and other incidents, such as likely innocent routing errors or false positives due to changing circumstances.

Hijacking Internet Traffic by Manipulating BGP Routing Attributes

The selective traffic detouring in the February 2013 attacks from Belarus was achieved by manipulation of various Border Gateway Protocol (BGP) route attributes to redirect traffic through Belarus before forwarding it to its proper destination. Internet routing relies on the inherently insecure BGP, which influences routing tables worldwide by announcing and withdrawing prefixes, i.e., ranges of contiguous Internet Protocol (IP) addresses assigned to individual organizations.

Figure 2:
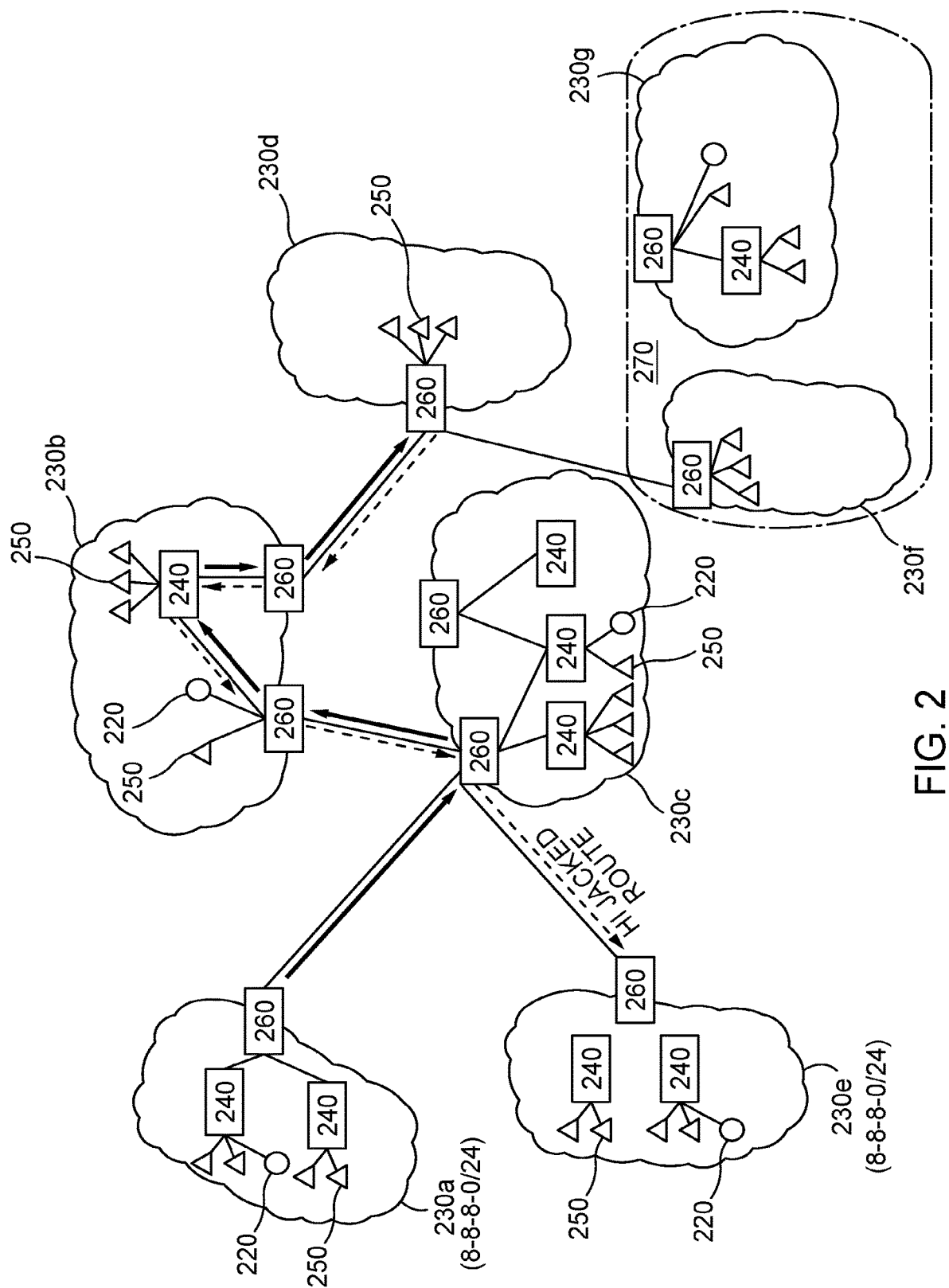
FIG. 2 illustrates an example of internet routing system including Autonomous Systems, Border Gateway Protocol (BGP) routers, and traceroute collector devices.

FIG. 2 illustrates an example of internet routing system including Autonomous Systems, BGP routers, and traceroute collector devices. (FIG. 2 shows a dramatically simplified representation for ease of understanding.) Every BGP update announcement originates at some Autonomous System (AS) 230a-230d (collectively, ASs 230) and comprises at least one prefix and a list of ASs 230 through which the announcement has traveled. This list of ASs 230 is called the AS path. Autonomous systems are identified by uniquely assigned numbers, known as AS numbers (ASNs), and correspond to organizations (or groups within them) that want to control how the global Internet reaches them.

For example, consider the Google-assigned prefix 8.8.8.0/24 (8.8.8.0 through 8.8.8.255), which can be observed via hundreds of unique AS paths, one of which is 8708 2914 6453 15169. The origin of this network is AS 15169 (Google) 230a, which announced the prefix to AS 6453 (Tata) 230c. In turn, Tata sent it to AS 2914 (NTT) 230b, which then passed it to a peer network (data source), AS 8708 (RCS & RDS of Romania) 230d. In BGP messages, the origin of a prefix is the rightmost AS on the path, whereas the data source is the leftmost AS. Thus, for RCS & RDS 230d to reach these Google IP addresses, it sends traffic to NTT 230b. NTT 230b then passes it to Tata 230c, which sends it over to Google 230a. The return path from Google to RCS &RDS could be completely different and depends on Google's routing table.

Typically, each prefix observed on the Internet has a single origin AS, the one responsible for its routing policy; however, there are legitimate uses for Multi-Originated AS (MOAS) prefixes, such as those available via Content Delivery Networks (CDNs) 270. For example, a CDN 270 might own multiple ASs, in this example, 230f and 230g, used in different parts of the world, and could announce the same prefixes from each of them. But multi-originations can also be a sign of malicious activity or operator error. For example, on 7 Jun. 2013, FSF Tecnologia (AS 262859) 230e also originated 8.8.8.0/24 as part of a routing leak, defined below, although its global impact was minimal. At this time, there were two competing routes to 8.8.8.0/24, one via Google 230a and the other via FSF Tecnologia 230e, creating a partial hijack of this prefix. In other words, during this hijack, some Google customers reached the proper Google servers 230a via the Google-originated route and others were misdirected to FSF Tecnologia 230e in Brazil. (As of this writing, Google hosts their open recursive DNS resolvers at 8.8.8.8 and 8.8.4.4. Google (AS 15169) announces these IPs addresses as part of 8.8.8.0/24 and 8.8.4.0/24, respectively.)

Google users misdirected to Brazil failed to reach a Google server and their requests died there, i.e., were "blackholed". If FSF Tecnologia were a malicious actor, it could have hosted bogus Google servers to answer these queries, correctly or not. Alternatively, it could have elected to redirect Google traffic back to its rightful destination via clean (non-corrupt) paths. This latter case is referred to as a Man-In-The-Middle (MITM) attack, which is much harder to execute and detect (as communications are not disrupted).

Another type of hijack involves more-specific prefixes (smaller portions) of normally announced prefixes. The Google prefix mentioned above is a more-specific prefix of 8.0.0.0/8 and 8.0.0.0/9, which are announced by Level 3. Since BGP favors more-specific routes over less-specific ones, traffic destined for 8.8.8.0/24 will travel to Google, rather than Level 3, when both options are available. Thus, the hijack of a currently unrouted more-specific prefix will generally result in a complete global hijack of that portion of address space, meaning that all global traffic will be sent there.

Consider 8.1.2.200, which currently hosts mail.condorferries.com and is routed only via 8.0.0.0/8 and 8.0.0.0/9 to Level 3. If someone were to announce a more-specific prefix that included this IP address, say 8.1.0.0/16 or 8.1.2.0/24, they could attract all of the traffic destined for this IP address since in BGP routing, these more-specific prefixes would take precedence over the less-specific ones. (Note that route selection is entirely a local decision, so a router can be configured to ignore more-specific of 8.0.0.0/8, although that would be a highly unusual administrative configuration.)

In summary, there are at least four combinations for any hijack. First, a hijack can be either: (1) an exact prefix match hijack, implying a partial global hijack; and (2) a more-specific prefix hijack, implying a complete global hijack for a portion of a larger prefix. In turn, each of these can be one of two types: (1) misdirected traffic terminates at the attacker, either blackholed or answered by illegitimate servers; or (2) misdirected traffic is rerouted to its proper destination, i.e., a Man-In-The-Middle attack. Each type of attack has occurred on a regular basis since 2013.

Detecting BGP Hijacks by Collecting and Analyzing BGP Routing Data

The techniques disclosed here identify deviations from normal routing baselines to uncover new and potentially malicious behavior. One challenge in detecting global hijacks is the fact that the correct state of the Internet at any point in time (as opposed to the correct state of a particular AS) is both unknown and unknowable. Straightforward approaches to this problem result in many thousands of false positives per day. So in the absence of any a priori knowledge of correctness, the techniques disclosed here use an understanding of the history and typical workings of the Internet (e.g. traffic engineering) derived from real-time and historical BGP routing data.

The processes for detecting hijacks can be run daily, although it can be trivially configured to run over any time period, including in real time. Typically, we are reporting on at most a handful of suspicious results per day, and sometimes none at all. In many situations, the goal is to provide an analyst with enough information to quickly assess the significance of each event and decide if it merits further action, while only capturing incidents that are truly novel.

BGP Routing and BGP UPDATE Messages

As well understood in the art of Internet routing, each AS 230, or routing domain, may include one or more routers 240, computing devices 250, BGP routers 260 (also known as border routers), and a network of traceroute collectors 220. An AS 230 can be thought of as a zip code of computing devices 250—i.e., each AS 230 can be pictured as a neighborhood of the Internet that is based on an ISP and not necessarily geographic in scope. Within each AS 230, the BGP routers 260 and other routers 240 that implement the routing policy of the AS 230 and maintain connections to BGP routers 260 in neighboring ASs. At the time of filing, the number of ASs 230 on the global Internet is over 56,000.

More formally, an AS 230 is a connected group of IP networks with a single, clearly defined routing policy that is controlled by a common network administrator (or group of administrators) on behalf of a single administrative entity (such as a university, a business enterprise, a business division, etc.). Nodes within a given IP network in an AS share the same network prefix, employing individual IP addresses within that prefix for Internet connectivity. Most ASs comprise multiple network prefixes.

The traceroute collectors 220 are real or virtual machines that reside within the data centers of their respective providers, each of which belongs to an Autonomous System (AS) 230, or routing domain. In operation, the traceroute collectors 220 measure latencies associated with routes to the routers 240, target computing devices 250, and Border Gateway Protocol (BGP) routers 260 (also known as border routers 260) within their own ASes 230 and within other ASes 230.

An AS 230 shares routing information with other ASs 230 by exchanging routing messages between border routers 260 using BGP, which is an exterior gateway protocol (EGP) used to perform inter-domain routing in TCP/IP networks. Routing information can be shared within an AS 230 or between ASs 230 by establishing a connection from a border router 260 to one of its BGP peers in order to exchange BGP updates. As understood by those of skill in the art, the process of exchanging data between border routers 260 is called "peering." In a peering session, two networks connect and exchange data directly. An internal BGP peering session involves directly connecting border routers 260 and internal routers 240 or only internal routers 240 within a single AS 230. An external BGP peering session involves connecting BGP routers 260 in neighboring ASs 230 to each other directly.

BGP routers 260 exchange different types of messages, including OPEN, UPDATE, KEEPALIVE, and NOTIFICATION messages. BGP UPDATE messages generally include information about changes that affect routing, including information about withdrawn routes, total path attributes, path attributes, and Network Layer Reachability Information (NLRI). Withdrawn routes information includes a list of IP address prefixes for the routes that are being withdrawn from service. Path attributes information includes properties of the routes along which traffic flows, including the path origin, the multiple exit discriminator (MED), the originating system's preference for the route, and information about aggregation, communities, confederations, and route reflection. And NLRI includes IP address prefixes of feasible routes being advertised in the update message.

For more on BGP routing, see, e.g., "A Border Gateway Protocol 4 (BGP-4)," RFC 4271, January 2006, which is incorporated herein by reference.

Collecting BGP UPDATE Messages

Figure 3:
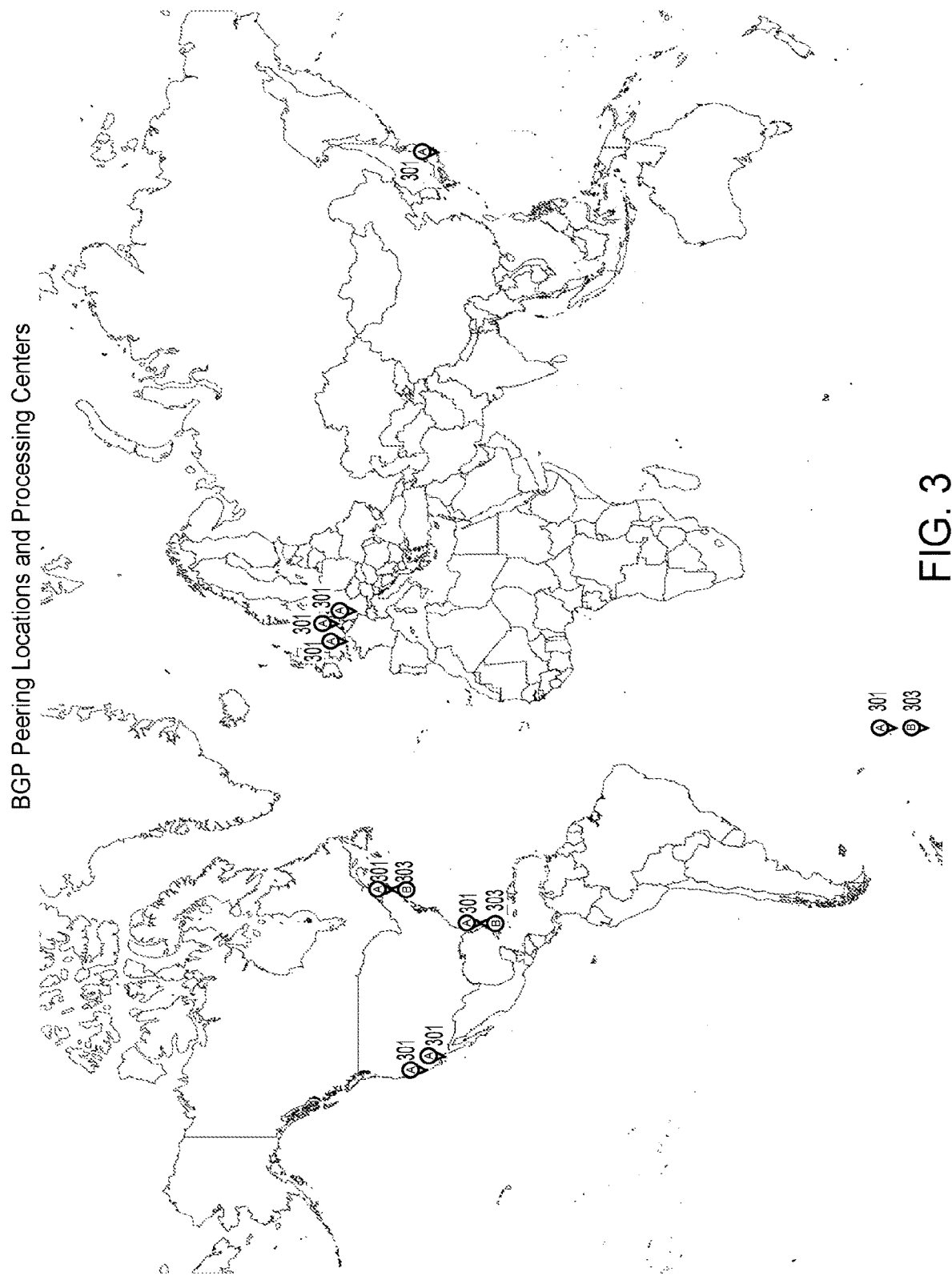
FIG. 3 illustrates several BGP routing data collection sites and traceroute locations.

FIG. 3 shows a system 300 that collects global BGP routing announcements, including BGP UPDATE, OPEN, KEEPALIVE, and NOTIFICATION messages, from hundreds of sources (BGP peers) as described below. These BGP routing announcements can be used to compute various data products, including inferred business relationships (edge tags) and integrated routing tables, for detecting hijacks. The system includes several remote data collectors 301 distributed worldwide and one or more data centers 303. Each remote data collector 301 can be implemented as a Linux server that is connected to a unique set of BGP routers operated by local ISPs. For instance, the eight remote data collectors 301 shown in FIG. 3 collects BGP routing data from over 400 IPv4 peers and from over 300 IPv6 BGP peers, although other numbers of remote data collectors 301 and peers are also possible. Similarly, although FIG. 3 shows that the data centers 303 are collocated with a subset of the remote data collectors 301, the data centers 303 may be located apart from the remote data collectors 301 as well. The number and locations of the remote data collectors 301 may also vary, in part because BGP routing data can be collected from a distance and so the number of locations is not all that material.

In operation, each remote data collector 301 stores and executes routing software, such as the Quagga Routing Software Suite, that monitors, collects, and stores BGP UPDATE, OPEN, KEEPALIVE, and NOFTIFICATION messages broadcast from the connected BGP routers. Unlike conventional routing software, the routing software executed by the remote data collectors 301 operates in read-only mode; that is, the remote data collectors 301 collect BGP routing data but do not necessarily supply routing data to the other servers.

The remote data collectors 301 store the BGP UPDATE, OPEN, KEEPALIVE, and NOTIFICATION messages on local disk (temporarily) and stream the BGP UPDATE messages back to the data centers for long-term storage 303 in a database and further processing. At each data center 303, the aggregate BGP updates from the peering sessions are processed as explained below to look for anomalies.

Other useful information (e.g., for reporting) includes geolocation data for assigning each AS to its major market. This geolocation data may be obtained using the techniques disclosed in International Publication No. WO 2017/015454, which is incorporated herein by reference in its entirety. For investigation of very suspicious activity, DNS data, traceroute data, and raw BGP messages can be used to uncover the domains that were potentially targeted by an attack and to identify Man-In-The-Middle style exploits.

Analyzing BGP Routing Data

As the BGP routing data is collected, it can be analyzed to identify potentially malicious BGP routing hijacks. This analysis includes filtering out the preponderance of innocent routing announcements from the few potentially malicious ones as described below. In short, the analysis process starts with a large set of all potentially suspicious originations and involves whittling that set down to those that are novel and cannot be explained by common routing patterns or by observable existing business relationships.

Figure 4A:
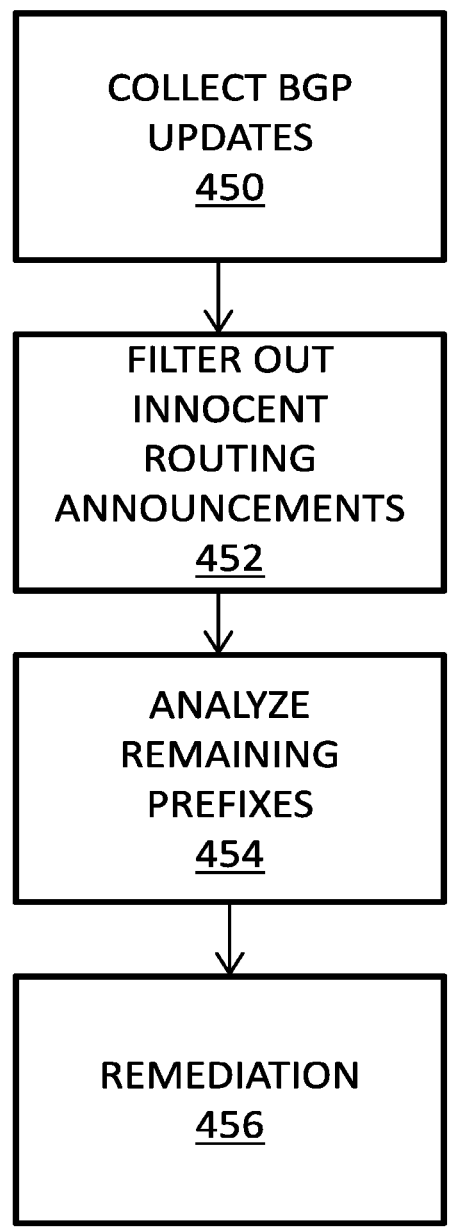
FIG. 4A is a flowchart that illustrates a high-level overview of a process for identifying routing hijacks.

FIG. 4A is a flowchart that illustrates a high-level overview of a process for identifying routing hijacks. The hijack identification process involves collecting BGP routing data (step 450) as described above with respect to FIGS. 2 and 3.

The BGP routing data includes path attributes information such as path origin. Innocent routing announcements are filtered out (step 452) by a series of steps disclosed in further detail below. The series of filtering steps eliminate false positives and capture changes in internet routing including possible hijacked routes. The suspected hijacked routes are further analyzed (step 454) to identify properties relating to the routes, such as new origin, number of peers accepting the new origin, and average times of hijack across misdirected peers.

The analysis of suspected routes could lead to identification of benign cases that might need remediation (step 456). For instance, bogus routes caused by human errors, leaks, and AS path corruption can be detected and an appropriate remedy can be identified. Remediation can also include alerting and notifying customers of the hijacked routes, alerting the "hijacker" (in case of innocent mistakes), and alerting upstream internet service providers, all so that the errant announcements can be either stopped in their entirely (from the source) or filtered out (by others) so that the errant routes are not followed or further propagated on the internet.

Figure 1:
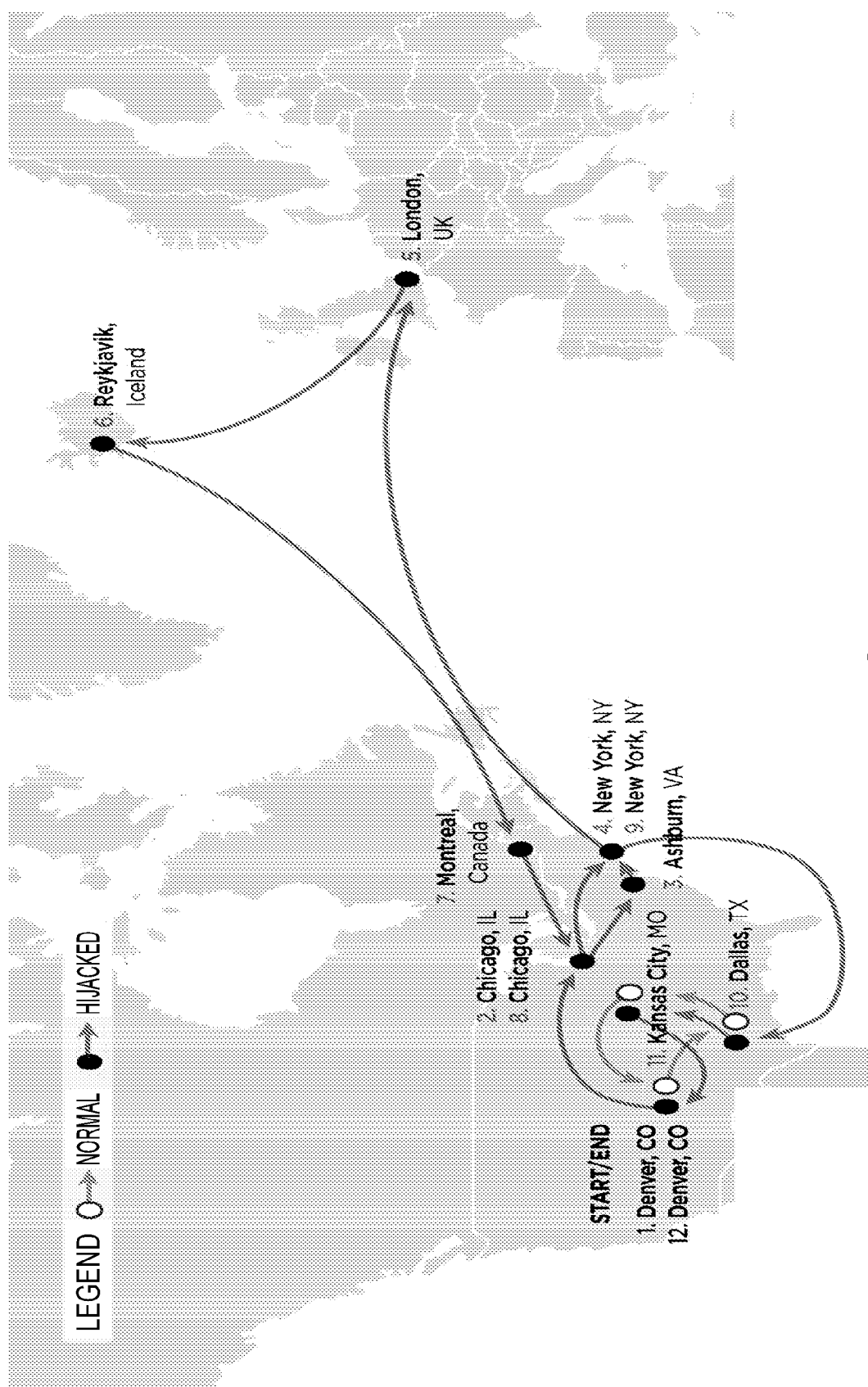
FIG. 1 illustrates a traceroute of hijacked traffic travelling between two locations in Denver, Colo., via Iceland.
Figure 4B:
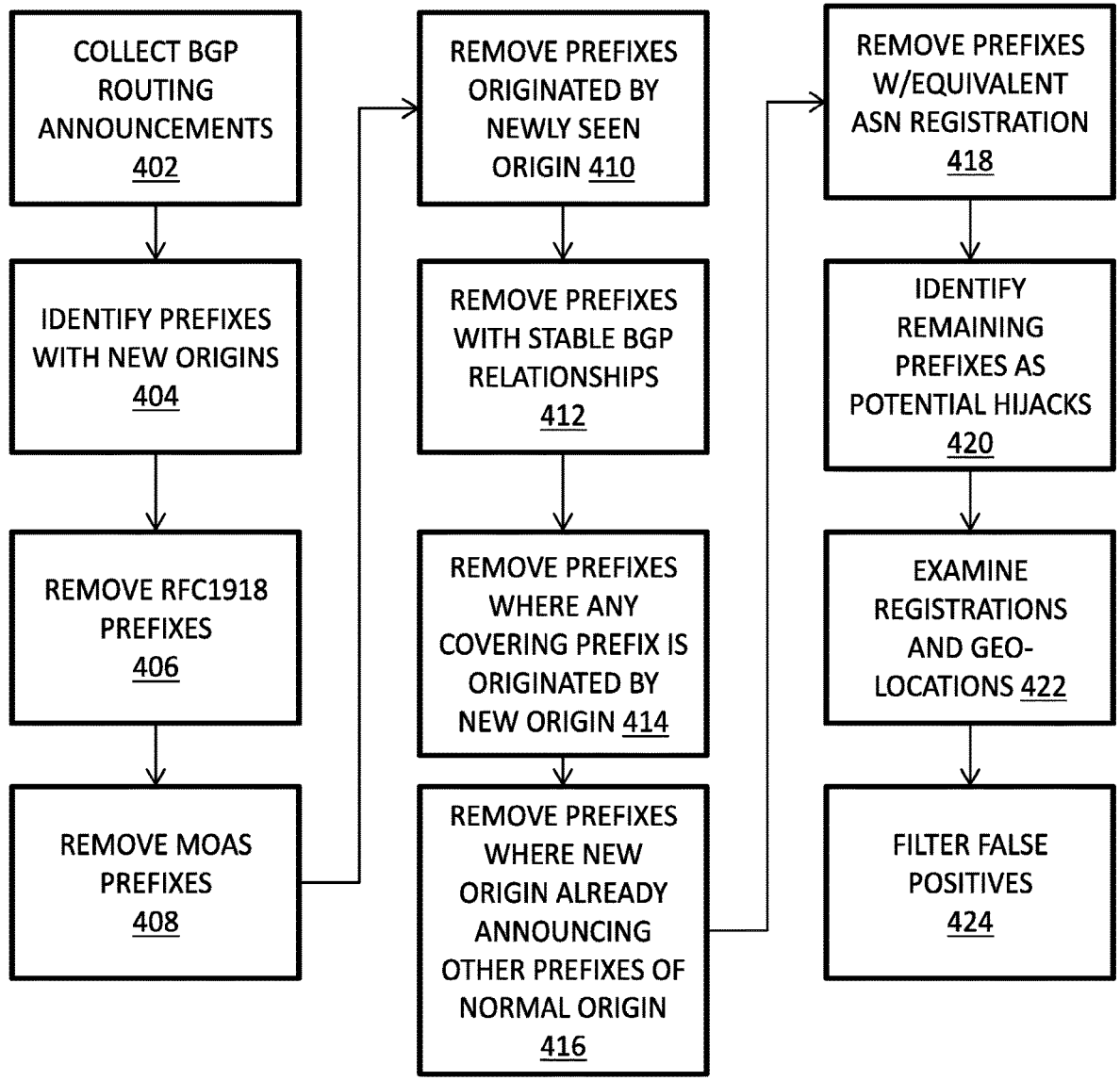
FIG. 4B is a flowchart that illustrates a process for identifying hijacks by collecting and processing BGP routing data.

FIG. 4B illustrates a hijack identification process 400 with interrelated steps that conservatively eliminate false positives, while capturing any truly novel changes in Internet routing. The hijack identification process 400 applies to the IPv4 Internet, and the techniques described here apply equally well to the IPv6 Internet as readily appreciated by those of ordinary skill in the art. Those of skill in the art will also appreciate that the steps listed below can be mixed, matched, modified, and rearranged as appropriate. They can also be executed in a simultaneous or overlapping fashion. For example, step 402, which involves collecting BGP routing data (step 402) as described above with respect to FIGS. 1, 2 and 3, may occur on a continual or continuous basis independent of the execution of the other steps.

Step 404 includes identifying prefixes with at least one new origin, compared to a fixed historical time period. These prefixes may or may not be simultaneously multi-originated (MOAS). If the origin of a new more-specific prefix differs from the origin of the more specific prefix's closest covering prefix, then the more specific prefix could be a potential routing hijack. Step 404 may also include identifying each new more-specific prefix with an origin differing from that of its closest covering prefix. Such more-specifics are also not necessarily MOAS, but could represent sub-prefix hijacks of larger routed prefixes. This step may result in a list of thousands of prefixes, which are subsequently filtered down to a much smaller set of suspicious originations. This list can be filtered further by limiting it to prefixes that are seen by a minimal set of the collection system's BGP peers (e.g., approximately 1% of the total) for some minimal amount of time (e.g., a few minutes).

While leaks (especially iBGP and eBGP re-origination leaks) are common on the Internet, most are short-lived or do not propagate far. The massive and infamous Chinese hijack from 2010 of 50,000 prefixes for 18 minutes definitely would not be filtered by this minimal check. One could classify every inadvertent leak by any ISP as a hijack, but there may be no global effect and this would lead to needless false positives. This rule is very conservative and intended to exclude low impact leaks, but report on all others.

Step 406 of the hijack identification process 400 includes removing RFC1918 prefixes entirely; these prefixes are not unique and hence not globally routable. Step 406 also includes removing any private ASNs from the beginning of each AS path, as well as single-digit ASNs, and using the remaining AS path for analysis. Since private ASNs are also not unique, they are not useful for origin hijack analysis, so step 406 involves using the first non-private ASN on the path as a proxy for the origin organization, which is unknown. Step 406 also includes removing single-digit ASNs because operators sometimes mistakenly use small integer values to represent the number of intended prepends on routers that do not support that syntax. In some cases, it is also safe to assume that single-digit ASNs, mainly US universities, are not involved in routing hijacks. This can be extended to account for providers known to replace private ASNs with their own ASNs.

In step 408, each MOAS prefix (but not more-specifics) is removed if the new origin is seen by nearly all peers. This excludes prefixes that seem to have legitimately moved from one AS to another during a given time period (e.g., one day) because a new origin that is seen by nearly all peers implies a coordinated move of prefixes from one AS to another. For any given single prefix, some peers may still retain stale routes; however, it is implausible for a hijacker to become the preferred route across all peers for that single prefix. In short, it is unlikely that a hijacker could attract essentially all traffic for a prefix away from an active and available legitimate advertiser of that prefix. Note that this step 408 does not include considering more-specifics prefixes, which are usually accepted by most peers.

Simply looking for MOAS prefixes and/or their more specifics generates an overwhelming number of false positives—even for prefixes not historically seen as MOAS. There are many reasons why different ASs might originate overlapping prefixes. One might be a transit provider of the other (primary or backup); some prefixes are anycast from CDNs employing different ASNs; prefixes are migrated between ASNs belonging to the same organization during periods of reengineering; and there are Distributed Denial of Service (DDoS) traffic cleansing firms that deliberately "hijack" customer routes for the purpose of DDoS mitigation. These scenarios and others should be taken into account by a systematic detection technique. The end result is a concise and comprehensive report, one that can be easily and efficiently reviewed for signs of malicious activity by an analyst, especially when correlated with DNS, traceroute data, and maps of global impact as explained below.

Step 410 includes removing prefixes from consideration that have been originated by the newly seen origin at any point in the past month. The first time such a prefix is observed, it is not be excluded by step 410. Afterwards, if the prefix is observed again from the same origin within the month, it is ignored. Because it is common practice for more-specific prefixes to be announced for traffic engineering by providers during a network migration, this check can fail to exclude the first such observation, but the prefix might still be excluded from a final report by one of the business relationship checks below.

For implementations that include step 410, ongoing or repeated hijacks may be identified only upon their first appearance. Thus, once a prefix has been hijacked, it should be added to a watch list for subsequent attacks and the suspected hijacking origin itself should be monitored.

In step 412, each prefix where the newly seen origin has a historical and stable BGP relationship with the previously seen origin is removed. Here, AS-to-AS relationship tags (edge tags) indicate dynamically computed business relationships for each stably observed AS adjacency pair in routing data (possibly updated daily to reflect change). The edge tags may be identified using boosting, which is a variant of machine learning that is called supervised learning and that takes advantage of multiple weak learners. In some cases, it is safe to assume that it is appropriate for two ASs with an established business relationship to originate each other's prefixes, such as when a provider temporarily announces a customer's prefixes. (A provider may also announce a prefix belonging to a customer's customer without necessarily leading to the prefix being flagged as suspicious.) Note also that the edge tags include clusters, which represent ASNs belonging to the same organization, pairs of which may not actually appear as adjacent in any BGP data.

Step 414 includes removing each prefix where any covering prefix is originated by the newly seen origin. Here it is assumed that an AS announcing a covering prefix can also legitimately announce a more-specific prefix, even if that more-specific is currently announced by some other AS (e.g., a customer).

Removing each prefix where the new origin was already announcing other prefixes (or more-specific prefixes) of the normal origin occurs in step 416. In step 416, it is assumed that an AS typically announcing a prefix for another organization can also legitimately announce other prefixes from that same organization. Note that organizations may not have observable BGP adjacencies; however, they may have business relationships allowing one to originate prefixes on the other's behalf. Implementations of the process 400 that include step 416 may identify additional hijacks of the same organization only upon the their first appearance. Thus, once an origin has been used in a hijack, it may be added to a watch list for subsequent attacks.

Step 418 includes removing each prefix where the registration of the newly seen ASN is roughly equivalent to the registration of the prefix or any covering prefix. To determine equivalence of registration, the strings involved are normalized and compared to a canonical form for a match. The normalization and comparison may be based on associated identifying strings (e.g., Microsoft and HotMail) maintained in a database. (An attacker could in theory register an ASN with the same or similar name to an intended victim's prefix in an attempt to elude detection by this check.)

In step 420, the remaining prefixes are reported to a user or analyst, e.g., for further review. The report may identify each (suspected) hijacked prefix, new origin, number of peers accepting new origin, average time of hijack across misdirected peers, normal number of peers observing this prefix, assignment information for ASs, and prefixes from registry records. The report may also include the country assignment of each AS involved. While prefixes can typically be geolocated narrowly, ASs can span countries, so a country may be assigned to each AS, depending on the market of the AS. Hijacks involving ASs from different assigned countries should be considered with higher priority, e.g., a Belarus AS hijacking a prefix originated by a United States AS.

Note that throughout the process 400 refers to routed prefixes. However, "hijacks" of unrouted space are also quite common. It's not unusual for spammers to look for unrouted space registered to others, presumably so they can deliver their email via untainted IP blocks and avoid detection. This is not a traditional hijack, as the space is not currently in use and, as such, attribution can be even more problematic. For routed space, especially that which is consistently routed over a long time period, there is at least an ongoing assertion of ownership, one that has direct operational impact on the Internet. For unrouted space, there may be only self-reported registration data for prefixes and ASNs and whatever references can be drawn from an ASN's past routing behavior. Given the notorious unreliability of self-reported information, reporting on potential hijacks of typically unrouted space is prone to many false positives.

Misappropriation of unrouted space can be captured by examining the registrations and country-level geolocations of the ASN and prefix involved (step 422). If both differ, the announcement is reported as a potential hijack of unrouted space. Thus, a Cogent prefix geolocating to the US could be announced by a Cogent AS associated with the UK and not raise an alarm. However, all of this can be problematic, as the presumed geolocation of previously unrouted prefixes may be highly suspicious (and likely comes from registration data) and many ASs have more than one country of operation. As a result, this approach may generate false positives, which can be filtered out using additional information (step 422).

The process 400 described here reports on meaningful changes in AS origin, whether for existing prefixes or new more-specifics of existing prefixes. If the origin itself is spoofed, as described in the attack illustrated at Defcon 16, it may not be adequate. Detecting a spoofed origin can be performed using information about the entire AS paths, novel adjacencies, and/or traceroute paths and latencies.

As spoofed origins and even spoofed upstreams have become more common, the process 300 has been adapted to make more use of edge tags as described in the previous paragraphs. Edge tags allow for the computation of the downstream transit cone of each AS, i.e., those prefixes that can be reached via the AS. If a prefix is hijacked via an announcement with a spoofed initial AS path fragment, then the hijack could be detectable in three ways. First, at the junction between the forged AS path fragment and the legitimately constructed AS path fragment, there will undoubtedly be a new edge (AS-AS adjacency) carrying the hijacked prefix. Second, the downstream transit cone of the ASes along the path (forged or not) will now contain the hijacked prefix, which may be unrealistic. And finally, the traceroute latencies and paths to the hijacked prefix may not be realistic. All of these anomalies are detected by process 400.

Figure 5:
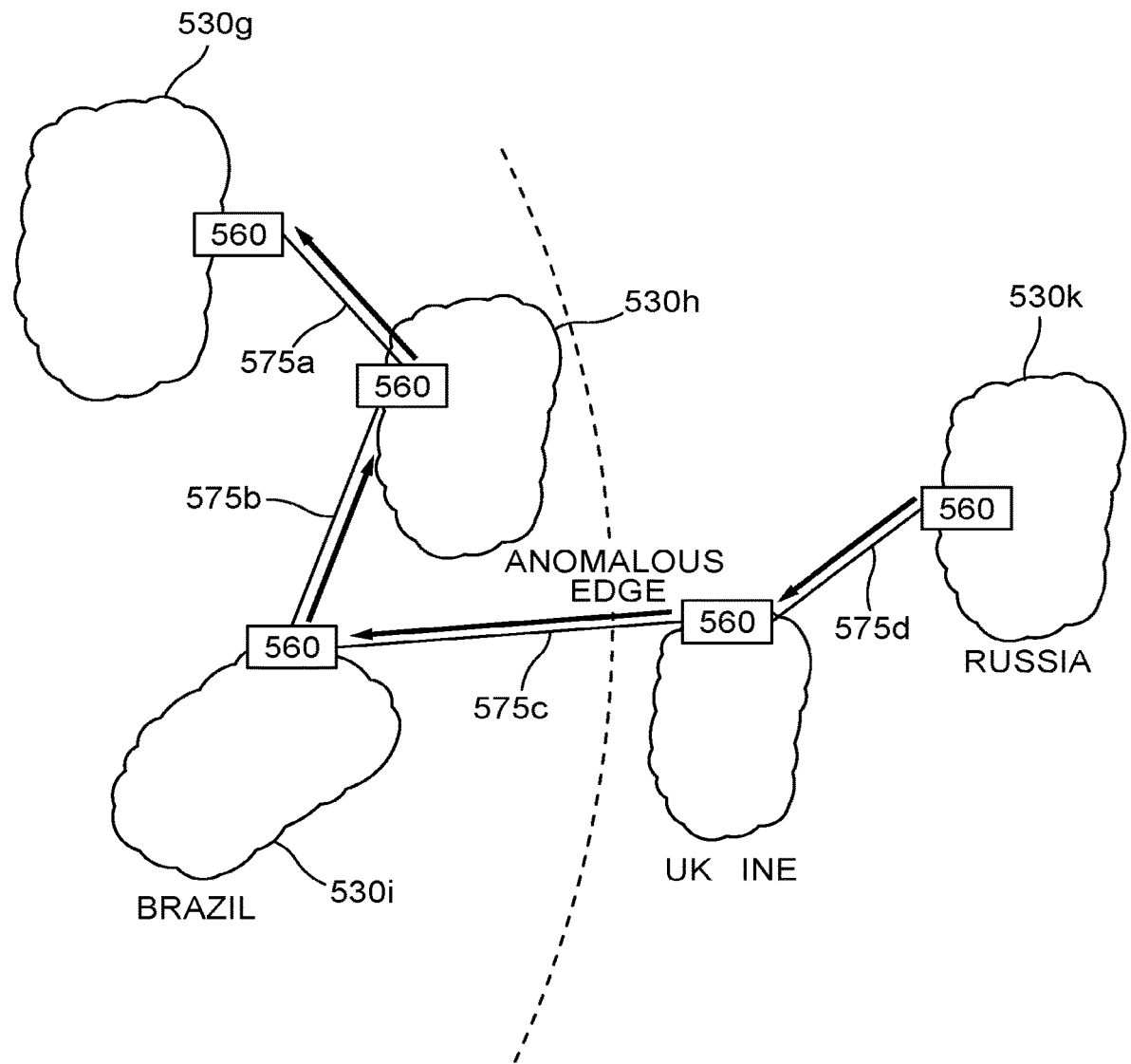
FIG. 5 illustrates an example of detecting spoofed origins by analyzing AS path fragments.

FIG. 5 illustrates the following example of detecting a spoofed origin. Consider that 200.202.64.0/19 (Brazil Home Shopping Ltd) was once announced along the following path:

. . . 9002 8438 18739 10495 11295

The right-most AS 530 is the apparent origin, namely, AS11295 (Brazil Home Shopping Ltd) 530g, which seems sensible. The next two ASes, AS18739 530h and AS10495 530i, are both Brazilian, as might be expected. However, this route appears exclusively through Ukrainian provider Hetman Soft (AS8438) 530j and then onto Russian fixed-line carrier RETN (AS9002) 530k. Here there is an anomalous edge 575c, 8438_18739 (Ukrainian provider to Brazilian provider), and anomalous downstream transit cones, namely, a Brazilian prefix downstream of Ukrainian and Russian ASNs. Process 400 detects these anomalies and flags this prefix as a potential hijack.

As a final piece of evidence, process 400 detects the following anomalous traceroute, along with many others, to the hijacked Brazilian prefix. Here the hijacked prefix is reached from Moscow in only 20 ms and via the Ukraine, which violates speed of light limitations and normal routing paths between Moscow and Brazil. All of these anomalies provide irrefutable evidence that this Brazilian prefix was hijacked in the Ukraine.

| trace from Moscow, RU to 200.202.64.1 | | | | |
|---|---|---|---|---|
| 1 * | | | | 0.0 |
| 2 87.245.229.46 | ReTN external interconnections | Moscow | Russia | 0.478 |
| 3 87.245.233.26 | ReTN's Backbone | Kiev | Ukraine | 19.717 |
| 4 * | | | | 0.0 |
| 5 200.202.64.1 | BR HOME SHOPPING LTDA | Belo Horizonte | Brazil | 20.419 |

Alternatively, the owner of such an attacked network could detect a spoofed origin using a conventional subprefix hijack detection alarm. To an outside observer, a spoofed origin might appear as a traffic engineering advertisement, but to the origin's operator, who knows his routing configuration, this would be a clear and obvious hijack. Nevertheless, a conventional routing alarm service may not detect an attack on an existing prefix (instead of a more-specific) if the attacker spoofed the legitimate origin. However, keep in mind that this exploit tends to generate very long AS paths and so should not end up attracting much, if any, traffic.

False Positives

The filtering described with respect to the hijack identification process 300 described above may be quite conservative to prevent missing any legitimate threats. However, this implies that the reports contain false positives, since the Internet is a very large and dynamic place with new business arrangements appearing constantly. In practice, the filtering generates at most a page of incidents per day, which is a small enough number for a trained analyst to review on a daily basis. While there are steps to further limit reported incidents, the remaining benign cases may be of interest in their own right, such as when an organization starts using a DDoS mitigation service, as described immediately below.

DDoS Mitigation

A number of commercial entities provide DDoS mitigation services by redirecting a customer's Internet traffic to their data centers for cleansing of the offending traffic. Legitimate traffic is then returned to the customer. These services rely on announcing customer prefixes via BGP during the attack, while the customer withdraws their own routes. If the transition is relatively clean and complete or the service has been used in the past, the hijack identification process 300 could easily omit such events. But overriding some of the checks in the hijack identification process 300 yields reports on DDoS activations, some of which may not be illegitimate hijacks, but rather an indication of DDoS protection being activated via this technique and hence, an indication that an organization might be under attack. DDoS mitigation can also be conducted with on-premise hardware devices (e.g., Arbor's Peakflow) or via DNS redirection, neither of which is visible at the BGP layer and so their use will not appear in our reports.

Human Error (Fat Fingers)

Since operators often manually enter prefixes and their origins into router configurations (at the source of their announcement), such entries are prone to human error. Mistakes of this nature can sometimes appear as potential hijacks. For example, M.V. Keldysh Institute for Applied Mathematics of Russian Science Academy (AS 33812) once appeared to be hijacking 8.10.120.0/24, normally announced by HostDime.com, Inc. (AS 33182). Notice the similarity in AS numbers and the fact that two transposed digits created the alarm. This situation was quickly rectified and was almost certainly the result of operator error.

In another apparent typographical error, Computer Information Systems Kuwait University (AS 25242) seemingly originated 64.191.236.0/24, which is normally observed from Network Foundations LLC (AS 36242). Notice that 2 and 5 on the keyboard are adjacent to 3 and 6. This error was corrected in a matter of two minutes. This example illustrates how important it is to examine the reported ASNs carefully and to consider the duration of incident. Very short-lived events involving similar numbers are often indicative of honest mistakes that are quickly remedied.

If desired, the prefix data can be filtered using a check for edit distance, such as not reporting potential hijacks involving ASNs that are edit distance 1 from each other, as one possibility. Although the probability is small, such a filter could potentially discard interesting facts, such as when ISC (AS 1280) apparently started originating prefixes in Iran (this was an error caused by someone in Iran inadvertently leaving a single digit out of TIC (AS 12880, formerly DCI)). Although this did not represent a real hijack, it did bring home the fact that the space of assigned ASNs is really quite small, so it is possible that an attacker could be edit distance 1 or 2 from its intended victim. In other words, what if Iran had hijacked ISC space? To avoid missing an attack perpetrated by an attacker within an edit distance of 1 or 2, the process 300 can be implemented without imposing any filters on edit distance. This may cause false positives due to simple typographical errors involving both origin ASNs and originated prefixes to appear in the reports.

RFC1918 Confusion

While the hijack identification process 300 includes removing private addresses, i.e., RFC 1918 space, from consideration, there can be some confusion about the exact format of these prefixes. As stated in the RFC1918 specification itself:

The Internet Assigned Numbers Authority (IANA) has reserved the following three blocks of the IP address space for private internets:
10.0.0.0-10.255.255.255 (10/8 prefix)
172.16.0.0-172.31.255.255 (172.16/12 prefix)
192.168.0.0-192.168.255.255 (192.168/16 prefix)

Unfortunately, bogus announcements for prefixes within 172.0.0.0/8 and 192.0.0.0/8 sometimes appear outside of the private portions. It could be that some operators are treating these much larger blocks as private and assigning them to their customers. When they happen to leak these out to the general Internet, they tended to propagate widely, as others will not filter them, nor should they.

For example, Uzpak Net (AS 8193) once announced 13 /24s of the form 192.1.x.y/24. Several of these were contained in 192.1.8.0/22, announced by BBN Technologies Corporation (AS 11488), and hence, constituted more-specific hijacks of this network. Other leaked prefixes, like 192.1.2.0/24, were not part of any announced prefix and hence, did not constitute hijacks. These prefixes were observed via some AS paths ending in a private ASN, namely, 8193_65000. This further suggests that AS 8193 assigns these blocks as private space to their customers (who use private ASNs) and simply dropped their filters that block propagation of such announcements (on at least some of their peering sessions). As explained below, this also had the unfortunate side effect of generating false AS adjacencies for providers who try to compensate for observing private ASNs.

Hijacks of this form are not really false positives. Uzpak did in fact hijack BBN and did so in a way that would attract all of the traffic for one /22. However, the intent was apparently not malicious and the situation was quickly rectified.

Leaks

A BGP leak typically occurs when a BGP speaker originates routes learned from others as if it were the legitimate origin. This is easier to do than one might think, since internal routing protocols (IGP) do not carry the AS paths found in BGP. Thus, if a provider's IGP-learned routes are re-injected into BGP, they will be propagated out to the global Internet with this provider as the origin. One of the earliest and most famous examples of a leak with global impact occurred in 1997, when AS 7007 (MAI Network Services) accidently leaked a substantial part of its routing table to the internet thus creating a routing black hole. The routes leaked were more specific than the routes originally present on the internet and as a result of this leak, the leaked routes became more preferred paths. Such leaks have been occurring with regularity ever since.

Many operators take steps to avoid accepting and propagating obvious leaks, such as setting maximum prefix counts on their peering sessions. But even with such restrictions in place, leaks of a more limited scale are always possible. For example, JV A-Mobile Ltd (AS 50257), a joint Abkhazian-Russian mobile provider, once announced 9 prefixes, all geolocating to a region around the Black Sea. (They currently announce more prefixes.) However, one day, JV A-Mobile announced an additional 19 prefixes, all seemingly related to mobile services and geolocating to wide variety of countries, such as Great Britain, Brazil, Italy, Turkey and many others. Given that the impacted prefixes were all related to mobile providers and that the incident last only a few minutes, this could have represented a leak of GRX peers at a private exchange.

As another leak example, consider the NedZone Internet BV (AS 25459), which normally announces 25 prefixes. Then at one point, they announced an additional 339 prefixes for about 2 minutes. This incident received some attention since some of the leaked prefixes belonged to Amazon and various financial services companies (e.g., JP Morgan Chase, PNC Bank, HSBC Bank, etc.). However, only 29 of the additional prefixes were /24s or larger, implying that they were potentially globally routable. The remaining 310 were smaller prefixes, including 72 /27s and 69 /32s (single IP addresses). Since most providers filter any prefixes smaller than a /24, most of the leaked prefixes did not travel very far. However, this leak was long enough and seen by enough peers to be reported as a potential hijack. Looking at the duration of the event and the preponderance of small prefixes suggests that these announcements were most likely not malicious and were not far-reaching, although NedZone's treatment of such an interesting collection of prefixes is left unexplained.

AS Path Corruption

Occasionally, mangled AS paths may introduce non-existent edges and/or false originations. As a result, this may yield a report on potential hijacks based on this misleading information where no relationship exists.

Suppose a customer announces its routes via a private ASN to its providers. Since such an ASN is not guaranteed to be globally unique, the providers should strip off this origin before propagating the routes further, allowing customers of other providers using the same private ASN to see these announcements. Since the collection system insists on full routing tables from its peers (as if it were an actual customer), it can still see such private originations, but generally the rest of the world should not (except possibly customers of the providers employing private ASNs). As noted above, these private originations are stripped off because they cannot be guaranteed to be unique and hence are not meaningful with respect to potential hijacks.

Now consider an example of private ASNs leading to AS path corruption. One day, the prefix 202.56.6.0/24 originated at various times by both AS 24389 (GrameenPhone Ltd.) and AS 65000 (private). During parts of this day, these two different originations were accepted by over 300 of BGP peers. Analyzing this data using the hijack detection process 300 stripped off AS 65000 and considered only the first non-private upstream, which was AS 24389 in this case, implying no incident of hijacking.

Now, consider the following routing announcements, all of them seen within the same minute and presented in the order in which they were received.

45274:202.129.248.4 202.56.6.0/24 45274 7473 4788 58682 24389 24389 24389 24389 65000
4787:202.158.51.200 202.56.6.0/24 4787 38158 4788 58682 24389 24389 24389 24389 65000
7552:125.235.255.254 202.56.6.0/24 7552 1273 4788 58682 24389 24389 24389 24389 65000
22822:203.190.230.1 202.56.6.0/24 22822 4788 58682 24389 24389 24389 24389
9503:202.53.188.194 202.56.6.0/24 9503 4610 4788 58682 24389 24389 24389 24389 9503
37958:206.223.143.119 202.56.6.0/24 37958 174 4788 58682 24389 24389 24389 24389 37958

Notice that the first three announcements imply private ASN 65000 is adjacent to AS 24389 since these two ASNs are listed next to each other. The collection system should not be seeing such a private ASN from these peering session (first column) since they are not customers of AS 24389. Instead, the routes should look more like the fourth line shown above, where the private ASN is not present and has probably been stripped out by AS 24389.

Finally, observe that in the last two routes shown, the initial ASN on the path is the same as that of the peer. Upon receiving a route with a private ASN, it makes sense for the recipient to replace the private ASN with its own ASN. This ensures that any of its customers using private ASNs should still see this route, since there can now be no conflict, and the AS path length will still be preserved. AS 9503 is FX Networks from New Zealand and AS 37958 is Beijing Blue I.T. Technologies from China. While intentionally corrupting an AS path is not desirable from an Internet intelligence perspective, it was GrameenPhone's failure to filter private ASNs that seems to have generated this substitution. In turn, this generates a potential hijack alert using the hijack identification process 300, as this prefix appeared to have new non-private origins. As noted above, compensating for providers known to behave in this way reduces the chance of such false positives.

Hidden and Novel Relationships

Since a priori knowledge of Internet correctness does not exist, the system and process rely on historical BGP routing data and AS relationship information to tackle the problem of finding routing hijacks anywhere in the world. Of course, whenever a new business relationship appears, it creates the potential of reporting false positives. This is largely unavoidable, but if there is any hint of a prior routing-visible relationship, the rules may be designed to find and filter out such changes from our reports.

For completely novel routing behavior, the hijack identification process may still report a potential hijack where no truly malicious behavior exists. A good example of novel relationships is provided above with respect to DDoS mitigation services. One day a company is not using such a service and the next day it is. For all practical purposes, the DDoS mitigation provider is now "hijacking" the company's prefixes, only the intent is not malicious. In turn, the hijack identification process reports on the hijack, calling it out as a DDoS activation.

As another example, seemingly disparate organizations may have no relationship visible in the data or even any apparent reason to cooperate. Consider Callis Communications (AS 17099) of Mobile, Ala., which originates 204.128.222.0/24, registered to the Mobile Area Chamber of Commerce. At one point, it was also originated by AT&T (AS 7018), which was historically the only origin, and could be captured by the hijack identification process as a potential hijack.

While there is no apparent relationship between these two entities in routing, a little searching uncovered evidence of a wholesale telecommunications agreement. At present, only Callis Communications is originating this prefix, so it appears to have transitioned away from AT&T. While none of this is particularly suspicious or surprising, it would be difficult to discern (and hence filter out) before its appearance in routing. Such false positives are common between large organizations and much smaller ones, presumably due to local or regional business arrangements.

False positives of this nature can be flagged by distinguishing between ASs in the same and different countries in the hijack reports. For instance, a higher priority may be placed on investigating potential hijacks involving different countries versus those involving the same country. Filtering out all hijacks occurring strictly between ASs within the same country would further reduce the number of incidents reported.

AS Sets

The AS_PATH attribute in BGP updates can comprise two different data types, namely, an AS_SEQUENCE or the far less common AS_SET. An AS_SET represents an unordered collection of ASs, and unlike an AS_SEQUENCE, adjacencies cannot be inferred directly from a set. For example, consider the following AS PATH consisting of a single AS SEQUENCE, denoted as an undecorated sequence of AS numbers: 174 209. Ignoring the possibility of prepending, this path probably represents a route shared to us by AS 174, which passed directly from its originator, namely, AS 209. That is, 174_209 represents a single BGP edge. (Although it would be rather unusual, AS 174 could prepend AS 209 to the path to trigger BGP's loop detection, which would cause the route to be ignored at AS 209's border. This blinding technique (demonstrated in an academic BGP MITM attack and sometimes used for traffic engineering) would prevent AS 209 from learning of the route.)

Now consider a slightly more complicated AS_PATH with one AS_SEQUENCE followed by an AS_SET, the latter denoted by a set of AS numbers in curly braces: 174 {1982, 32834}. How should this be interpreted? By the BGP specification, it is not possible to determine the ordering of the ASNs and thus it is impossible to know which of the following edge sets is correct.

1) 174_1982, 174_32834
2) 174_1982, 174_32834, 1982_32834
3) 174_1982, 174_32834, 32834_1982
4) 174_1982, 174_32834, 32834_1982, 1982_32834 (1982 and 32834 are peers)
5) 174_1982, 1982_32834
6) 174_32834, 32834_1982

For historical reasons, in the processed data, the hijack identification process 300 treats AS sets as if they were sequences, so option (5) is chosen from the list above. If any of the other interpretations are correct instead, the report may include false edges or be missing edges. Unfortunately, there is no practical solution to this problem. Assuming all possible edges could yield false negatives when looking for origin hijacks. Assuming none of these edges exist could generate false positives. If an AS set appears at the end of the AS path, the origin of the prefix is simply ambiguous. Thankfully, AS sets are rarely used, but they do exist in the data and might need to be considered (e.g., by an analyst) when evaluating potential hijacks.

Hijack Reports

The reports may be generated in human-readable form (delivered in files or via email) and in JSON, e.g., at a particular time every day. The ASNs and prefixes in the reports may be identified by identifying labels derived from registration data, which may be entered by humans and prone to error.

As an example, consider the following report, which includes an alert about a new more-specific:
NEWLY ROUTED MORE SPECIFIC PREFIXES:
AS198596 (SC TEHNOGRUP SRL RO) announced 2 new more specific prefixes:
   192.42.126.0/24 (Dutch Institute for Fundamental Energy Research (DIFFER) NL) 401×0.88 avgh
   under 192.42.120.0/21 0 AS1103 (SURFnet, The Netherlands NL) 402×24.00 avgh.
   192.72.15.0/24 (imported inetnum object for PMF TW) 402×0.89 avgh
   under 192.72.8.0/21 (Digital United I TW) AS4780 (Digital United TW) 406×24.00 avgh.

This states that AS 198596, registered as SC Tehnogrup SRL of Romania, announced two more specifics (/24s) of prefixes routed by others. These larger prefixes both happen to be /21s, one of which is announced by AS 1103, SURFnet of the Netherlands, and seen by 402 of our peers, and the other is announced by AS 4780, Digital United of Taiwan, and seen by 406 of our peers. Both of these covering prefixes were observed for the entire day in question, i.e., for an average of 24 hours over all peers seeing them.

The first hijacked /24 in this report is registered to the Dutch Institute for Fundamental Energy Research and was seen by 401 of our peers for an average of 0.88 hours during the course of the day. The second hijacked /24 was seen for about the same length of time but by 402 peers. Note the odd registration label of this prefix and the missing registration label of the SURFnet /21 for the first hijack. This is how these entities appear in the RIPE and APNIC databases.

A MOAS alert from the same report is shown next:
SUSPICIOUS MULTIPLE ORIGIN PREFIXES:
AS58272 (LeaderTelecom B.V. NL) announced 2 suspicious prefixes:
   46.243.174.0/24 (LLC Bellerofont RU) 120×16.05 avgh.
   originated by AS201969 (LLC Bellerofont RU) 402× 19.25 avgh
   46.243.175.0/24 (Russian Scientific Fund RU) 119×16.03 avgh.
   originated by AS201969 (LLC Bellerofont RU) 402× 19.30 avgh This report fragment shows a Netherlands provider, LeaderTelecom, announcing two /24s, both of which are also being announced by Bellerofont of Russia. This could represent an error by LeaderTelecom, as they also happen to announce the nearby prefixes of 46.243.160.0/21 and 46.243.184.0/21, or it could represent some legitimate arrangement. LeaderTelecom does transit Russian prefixes, although they have no obvious connection to Bellerofont in routing. Regardless, during this day, these /24s were originated by different organizations for most of the day, with different sets of our routing peers selecting each one.

As an example of new DDoS protected prefixes, consider the following report:
NEW DDOS-PROTECTED PREFIXES:
AS19905 (NeuStar, Inc. US) announced 7 new protected prefixes:

37.205.32.0/24 (Tolvu-og Rafeindapjonusta Sudurlands ehf IS) AS19905 (NeuStar, Inc. US) 380×6.88 avgh under 37.205.32.0/21 (Tolvu-og Rafeindapjonusta Sudurlands ehf IS) AS59396 (Tolvu-og Rafeindapjonusta Sudurlands ehf IS) 387×23.88 a vgh.

46.183.242.0/24 (Blackboard Managed Hosting Nets NL) AS19905 (NeuStar, Inc. US) 380×19.12 avgh under 46.183.240.0/22 (Blackboard Managed Hosting Nets NL) AS35156 (Blackboard International B.V. NL) 385×23.96 avgh.

208.78.91.0/24 (M8 Singlesnet LLC US) 258×0.51 avgh. originated by AS19071 (Match.com, L.L.C. US) 383× 23.58 avgh 208.83.242.0/24 (Match.com, L.L.C. US) AS19905 (NeuStar, Inc. US) 378×0.57 avgh under 208.83.242.0/23 (Match.com, L.L.C. US) AS19071 (Match.com, L.L.C. US) 385×23.96 avgh.

208.83.243.0/24 (Match.com, L.L.C. US) AS19905 (NeuStar, Inc. US) 378×0.41 avgh under 208.83.242.0/23 (Match.com, L.L.C. US) AS19071 (Match.com, L.L.C. US) 385×23.96 avgh.

208.91.199.0/24 (PDR US) AS19905 (NeuStar, Inc. US) 379×2.90 avgh under 208.91.198.0/23 (PDR US) AS40034 (Confluence Networks Inc VG) 386×23.96 avgh 209.99.17.0/24 (Need Servers Inc. US) AS19905 (NeuStar, Inc. US) 318×4.61 avgh; AS40034 (Confluence Networks Inc VG) 382×20.09 avgh under 209.99.0.0/17 (YHC Corporation US) AS3900 (YHC US) 386×23.96 avgh.

This shows NeuStar routing seven new prefixes for various organizations, including the dating site Match.com.

Finally, here is a snippet of a report on previously unrouted announcements:
SUSPICIOUS PREVIOUSLY UNROUTED SPACE PREFIXES:
AS62228 (Decision Marketing LTD BG) announced 4 suspicious prefixes:

80.114.192.0/18 (Ziggo B.V. NL) 159×5.21 avgh.

159.100.0.0/17 (Transport Research Laboratory GB) 159×5.21 avgh.

171.25.0.0/17 (Swisscom IT Services AG CH) 159×5.21 avgh.

193.243.0.0/17 (Cable & Wireless UK P.U.C. GB) 159× 5.21 avgh.

This snippet shows Decision Marketing from Bulgaria announcing a variety of previously unannounced space associated with other organizations and countries.

By detecting a potential hijack, the victim of the hijack can be notified. The victim can stop the hijacker or alert upstreams and/or hosting centers to filter bogus announcements. In some extreme cases, the bad actor can be shut down entirely.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of detecting routing hijacks on the Internet, the method comprising:
   collecting a plurality of Border Gateway Protocol (BGP) updates from a plurality of BGP routers among a plurality of Autonomous Systems (ASes), the plurality of BGP updates comprising a plurality of origins for a plurality of prefixes;
   determining that a first BGP update, of the plurality of BGP updates, corresponds to a first prefix that is associated with a first new origin relative to a first set of one or more historical origins;
   responsive to determining that the first BGP update corresponds to the first prefix that is associated with the first new origin relative to the first set of one or more historical origins, determining whether the first BGP update meets an exclusion criteria for excluding the first BGP update from being reported as a potential routing hijack;
   responsive to determining the first BGP update meets the exclusion criteria for excluding the first BGP update from being reported as a potential routing hijack, refraining from reporting the first BGP update as a potential routing hijack;
   determining that a second BGP update, of the plurality of BGP updates, corresponds to a second prefix that is associated with a second new origin relative to a second set of one or more historical origins;
   responsive to determining that the second BGP update corresponds to the second prefix that is associated with the second new origin relative to the second set of one or more historical origins, determining whether the second BGP update meets the exclusion criteria for excluding the second BGP update from being reported as a potential routing hijack; and
   responsive to determining the second BGP update does not meet the exclusion criteria, reporting the second BGP update as a potential routing hijack.

2. The method of claim 1, wherein determining the first BGP update meets the exclusion criteria for excluding the first BGP update from being reported as a potential routing hijack includes determining the first BGP update is associated with a Multi-Originated AS (MOAS) prefix and the first new origin was seen by all peers of the first new origin.

3. The method of claim 1, wherein determining the first BGP update meets the exclusion criteria for excluding the first BGP update from being reported as a potential routing hijack includes determining a first prefix in the first BGP update is associated with
   the first new origin and has a BGP relationship with an origin older than
   the first new origin.

4. The method of claim 1, wherein determining the first BGP update meets the exclusion criteria for excluding the first BGP update from being reported as a potential routing hijack includes determining a first prefix in the first BGP update is associated with
   a covering prefix originated by the first new origin.

5. The method of claim 1, wherein determining the first BGP update meets the exclusion criteria for excluding the first BGP update from being reported as a potential routing hijack includes determining a first prefix in the first BGP update is announced by
   the first new origin for an organization, wherein the first new origin previously announced at least one other prefix for the organization.

6. The method of claim 1, further comprising:
   comparing registration and country-level geolocation of an AS number and each prefix in the plurality of prefixes.

7. The method of claim 1, wherein generating the potential hijack report comprises detecting at least one of an AS path corruption, a routing anomaly caused by human error, a leak, or a hidden BGP relationship.

8. The method of claim 1, wherein determining that the first BGP update meets the exclusion criteria comprises determining at least one of:
   (a) the first BGP update is associated with a Multi-Originated AS (MOAS) prefix and the first BGP update is seen by all peers of the first new origin;
   (b) the first prefix has a BGP relationship with an origin older than the first new origin;
   (c) the first prefix is associated with a covering prefix originated by the first new origin; and
   (d) the first prefix was announced by the first new origin for an organization, wherein the first new origin previously announced at least one other prefix for the organization.

9. The method of claim 1, further comprising:
   detecting whether at least one of the first new origin and the second new origin is a spoofed origin.

10. The method of claim 9, wherein detecting whether at least one of the first new origin and the second new origin is a spoofed origin comprises:
    analyzing an initial AS path fragment included in a BGP announcement;
    detecting an anomaly in a downstream transit cone based on the analysis; and
    determining a traceroute latency for the anomaly.

11. A method of detecting routing hijacks on the Internet, the method comprising:
    collecting a plurality of Border Gateway Protocol (BGP) updates from a plurality of BGP routers among a plurality of Autonomous Systems (AS s) on the Internet, each BGP update in the plurality of BGP updates including at least one prefix;
    identifying a plurality of prefixes with at least one new origin from among the prefixes included in the plurality of BGP updates;
    determining that a first prefix, of the plurality of prefixes, is not associated with any registration of a set of one or more new Autonomous System Numbers (ASNs);
    responsive to determining the first prefix is not associated with any registration of the set of one or more new Autonomous System Numbers (ASNs): and
    reporting the first prefix as a potential routing hijack.

12. The method of claim 11, further comprising:
    removing a single-digit ASN from each AS path in the plurality of BGP updates; and
    analyzing each AS path, having the single-digit ASN removed, to detect routing hijacks.

13. The method of claim 11, wherein reporting the at least one prefix includes detecting at least one of an AS path corruption, a routing anomaly caused by human error, a leak, or a hidden BGP relationship.

14. The method of claim 11, further comprising:
    determining if a geolocation of the at least one new ASN in the set of one or more new ASNs is different from that of an associated prefix.

15. The method of claim 11, further comprising:
    removing a private ASN from the beginning of at least one AS path in the plurality of BGP updates.

16. The method of claim 15, further comprising:
upon removing the private ASN, analyzing the at least one AS path for a routing hijack.

17. The method of claim 11, further comprising: detecting if the one or more new ASNs is a spoofed ASN.

18. The method of claim 17, further comprising:
analyzing an initial AS path fragment included in a BGP announcement associated with one of the plurality of BGP updates;
detecting an anomaly in a downstream transit cone based on the analysis; and
determining a traceroute latency for the anomaly.

* * * * *